(12) United States Patent
Huang

(10) Patent No.: US 7,154,499 B2
(45) Date of Patent: Dec. 26, 2006

(54) TWO-LEVEL REJECTION IN 3D GRAPHICS

(75) Inventor: Hsilin Huang, Milpitas, CA (US)

(73) Assignee: VIA Technologies, Inc. (TW)

( * ) Notice: Subject to any disclaimer, the term of this patent is extended or adjusted under 35 U.S.C. 154(b) by 273 days.

(21) Appl. No.: 10/436,713

(22) Filed: May 13, 2003

(65) Prior Publication Data
US 2004/0227754 A1 Nov. 18, 2004

(51) Int. Cl.
*G06T 15/30* (2006.01)

(52) U.S. Cl. ...................... 345/421; 345/621

(58) Field of Classification Search ........... 345/421, 345/621, 622, 623, 624
See application file for complete search history.

(56) References Cited

U.S. PATENT DOCUMENTS

| | | | | |
|---|---|---|---|---|
| 5,751,291 | A * | 5/1998 | Olsen et al. | 345/422 |
| 5,757,321 | A * | 5/1998 | Billyard | 345/426 |
| 6,175,370 | B1 * | 1/2001 | Kunimatsu | 345/621 |
| 6,246,415 | B1 * | 6/2001 | Grossman et al. | 345/422 |
| 6,359,629 | B1 * | 3/2002 | Hopcroft et al. | 345/620 |
| 6,535,219 | B1 * | 3/2003 | Marshall et al. | 345/581 |
| 6,686,924 | B1 * | 2/2004 | Mang et al. | 345/620 |
| 6,734,853 | B1 * | 5/2004 | Heim et al. | 345/421 |

* cited by examiner

*Primary Examiner*—Mark Zimmerman
*Assistant Examiner*—Andrew Yang
(74) *Attorney, Agent, or Firm*—Anthony B. Diepenbrock, III; Dechert LLP

(57) ABSTRACT

A method and apparatus for efficiently rejecting a graphics primitive that is not visible in a defined area having a maximum x and y-coordinate. A data calculation block is configured to perform the rejection calculation on two levels. In the first level, the data calculation block determines if the graphics primitive is outside of the defined area or outside of the view frustum. This determination can take as little as one clock cycle. In the second level, the data calculation block determines whether the primitive is visible based on a vector normal to the primitive and the direction of culling. This determination may take as many as five clock cycles. When many of the rejections can be performed at the first level, there is a large performance increase. Furthermore, the sooner a rejection is determined, the sooner a new primitive can be processed by the data calculation block.

7 Claims, 6 Drawing Sheets

TWO-LEVEL REJECTION IN 3D GRAPHICS

FIELD OF THE INVENTION

The present invention relates generally to the rejection or culling of graphics primitives and more particularly the reduction of latency in the culling/rejection function.

DESCRIPTION OF THE RELATED ART

Three-dimensional graphics engines now operate at very high speed which will only increase in the future. This high speed makes the latency of an ALU used in the graphics engine a very critical design issue. This is especially true when the ALU is used to perform a culling/rejection function.

Thus, there is a need to improve the speed of the graphics engine when performing a culling/rejection function.

BRIEF SUMMARY OF THE INVENTION

A method in accordance with the present invention is a method of rejecting a non-visible graphics primitive. The method includes performing a logic operation on a first level to determine whether the graphics primitive lies outside of a defined area having a maximum x-value and a maximum y-value and being defined within a view frustum, and if the graphics primitive is not rejected on the first level, performing a calculation of a second level to determine whether the graphics primitive is visible in the defined area and rejecting the primitive if it is not.

One method in accordance with the present invention is a method of rejecting a non-visible graphics primitive having a plurality of vertices. The method includes (1) performing a logic operation on a first level to determine whether the graphics primitive lies outside of a defined area having a maximum x-value and a maximum y-value and being defined within a view frustum and rejecting the primitive if the primitive is outside the defined area, and (2) if the graphics primitive is not rejected on the first level, performing a calculation on a second level to determine whether the graphics primitive is visible in the defined area and rejecting the primitive if it is not, where each vertex has a x, y, and w-coordinate value and the step (1) of performing the logic operation on the first level includes, for each vertex, (a) determining a sign of the x, y, z and w coordinates, (b) comparing the y-coordinate to a maximum y-coordinate value and comparing the result to the sign of the w-coordinate to form a y-max result for the vertex, (c) comparing the x-coordinate to a maximum x-coordinate value and comparing the result to the sign of the w-coordinate to form a x-max result for the vertex, (d) comparing the sign of the x-coordinate to the sign of the w-coordinate to form a x-sign result, (e) comparing the sign of the y- coordinate to the sign of the w-coordinate to form a y-sign result, (f) 'anding' the x-max results of the vertices, (g) 'anding' the y-max results of the vertices, (h) 'anding' the x-sign results of the vertices, (i) anding' the y-sign results of the vertices, (j) 'anding' the signs of the w- coordinates of the vertices, (k) determining if any of the 'anded' results is true, and if so, rejecting the primitive.

A system in accordance with the present invention includes a command block, a round robin selector, a plurality of vertex cache decoder/request units, a scheduling and data fetching block, a data calculation block, and a thread flag register. The command block is configured to store an index that references a primitive, where the primitive has one or more vertices. The round robin selector is connected to the command block to receive an index. The plurality of vertex cache decoder/request units, are each configured to store an index received from the round robin selector and to convert the index into a pointer to the coordinates of each vertex of the primitive. The scheduling and data fetching block is connected to received a pointer from a selected one of the decoder/request units and configured to fetch the coordinates of each vertex of the primitive using the pointer. The data calculation block is connected to the scheduling and data fetching block and configured to determine from the fetched coordinates of each vertex whether the primitive is visible in a defined area and to provide a first level rejection signal or a second level rejection signal when the primitive is not-visible in the defined area, where the first level rejection signal is provided when it can be determined that the primitive is completely outside the define area and the view frustum, and the second level rejection signal is provided otherwise. The thread flag register is configured to store a plurality of flags, one for each vertex cache decoder/request unit, where each flag indicates whether the corresponding unit is available to receive an index, and the thread flag register is connected to receive a first level rejection signal and a second level rejection signal from the data calculation block and to alter the flag of the unit containing the index of the rejected primitive based on the first or second level rejection signal.

A system in accordance with an embodiment of the present invention is a system for rejecting a non-visible graphics primitive. The system includes a command block, a round robin selector, a plurality of vertex cache decoder/request units, a scheduling and data fetching block, a data calculation block, and a thread flag register. The command block is operative to store an index that references a primitive, where the primitive has one or more vertices. The round robin selector is connected to the command block to receive an index. The plurality of vertex cache decoder/request units are each configured to store an index received from the round robin selector and to convert the index into a pointer to the coordinates of each vertex of the primitive. The scheduling and data fetching block is connected to receive a pointer from a selected one of the decoder/request units and configured to fetch the coordinates of each vertex of the primitive using the pointer. The data calculation block is connected to the scheduling and data fetching block and configured to determine from the fetched coordinates of each vertex whether the primitive is visible in a defined area and to provide a first level rejection signal or a second level rejection signal when the primitive is not-visible in the defined area, where the first level rejection signal is provided when it can be determined that the primitive is completely outside the defined area and the view frustum and the second level rejection signal is provided otherwise. The thread flag register is operative to store a plurality of flags, one for each vertex cache decoder/request unit, where each flag indicates whether the corresponding unit is available to receive an index, and the thread flag register is connected to receive a first level rejection signal and a second level rejection signal from the data calculation block and to alter the flag of the unit containing the index of the rejected primitive based on the first or second level rejection signal.

On advantage of the present invention is that throughput of the graphics engine is increased when a large percentage of graphics primitives that are not visible can be rejected by the first level rejection function.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1A:
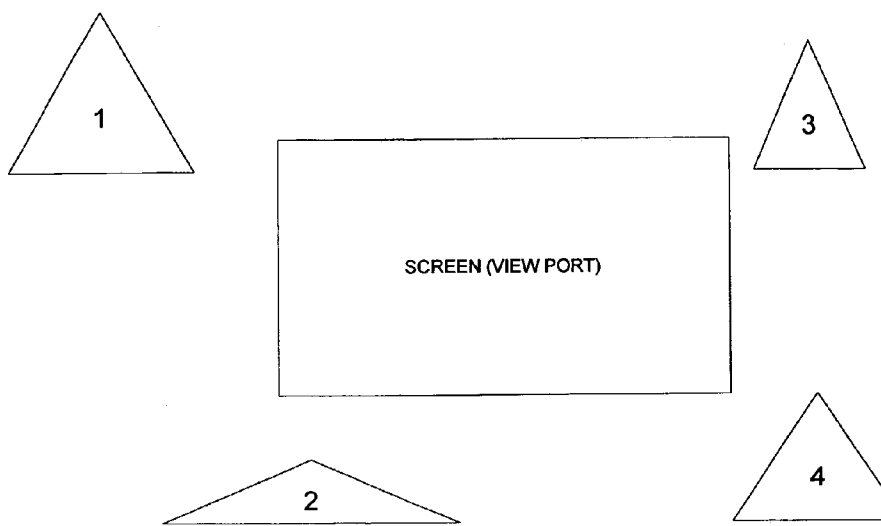
FIG. 1A shows first level rejection.
Figure 1B:
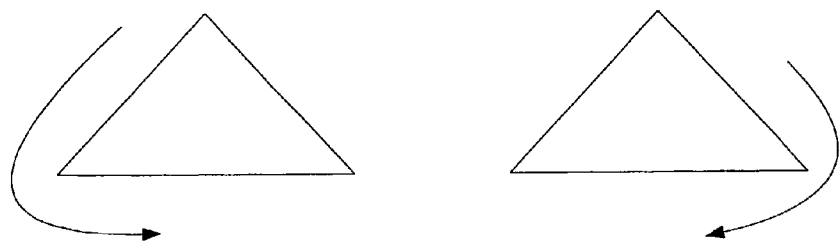
FIG. 1B shows second level rejection.

In accordance with the present invention, the rejection function is separated into two parts, a first level rejection and a second level rejection, as shown in FIGS. 1A and 1B. In the first level rejection, view port and negative W clipping is performed. In the second level rejection, a determinate and bounding box are calculated to determine whether a graphics primitive should be rejected. This separation of levels speeds up the processing of the rejection function.

First level rejection, according to the present invention, involves performing comparisons In particular, when the vertices of the graphics primitive are outside of Screen_Xmax or Screen_Ymax, or the three vertices are negative X, negative Y, or negative W, then the primitive is rejected. Properly carried out, these comparisons take only one clock cycle.

Second level rejection, according to the present invention, involves computing a determinate of a matrix in which the rows are the homogeneous coordinates of the vertices of the primitive. In the case of a triangle, the determinate effectively computes the cross-product of two vectors formed from two sides of a triangle. The cross-product has a direction that is normal to the surface of the triangle and its direction depends on whether clockwise or counter-clockwise has been chosen as the convention.

$$DET = \begin{bmatrix} X_0 & Y_0 & 1 \\ X_1 & Y_1 & 1 \\ X_2 & Y_2 & 1 \end{bmatrix} = (X_0 - X_2)(Y_1 - Y_2) - (X_1 - X_2)(Y_0 - Y_2)$$

If the sign of the determinate is equal to 1, then the current triangle is counter-clockwise. With the backface defined as "counter-clockwise," if the sign of the determinate matches the backface orientation, then the triangle should be rejected. This is expressed below as rejection=sgn(DET) XNOR (backface_orientation eq "counter-clockwise").

If the backface is defined as "clockwise," and the sign of the determinate is 1, then the above formula does not reject the triangle.

Figure 2:
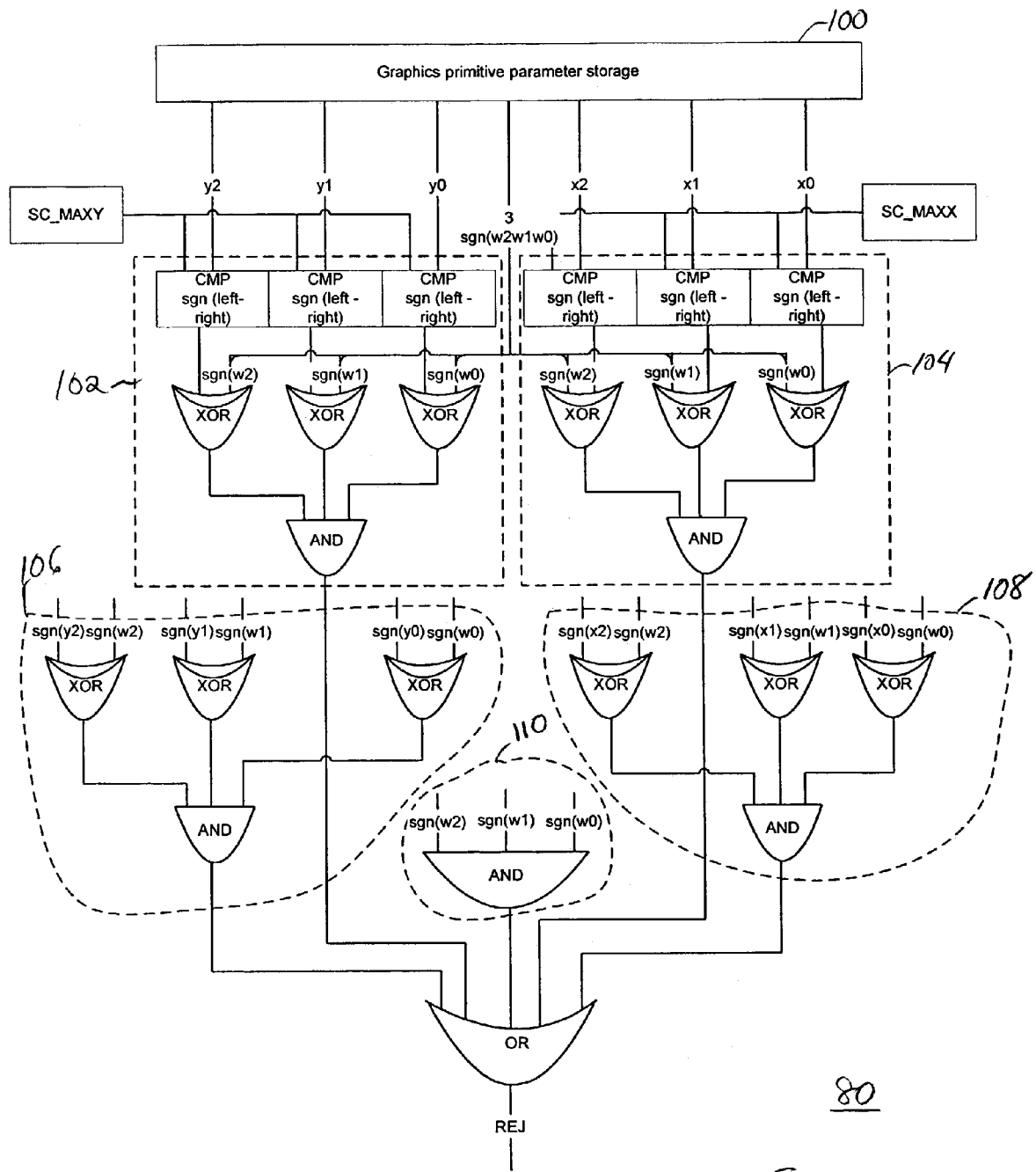
FIG. 2 shows an embodiment of first level rejection logic in accordance with the present invention.

FIG. 2 shows an embodiment of first level rejection logic 80. The logic includes a graphic primitive storage block 100 that provides the coordinate information for the comparison logic, a plurality of Max_Y comparators, a plurality of Max_X comparators, a plurality of sign comparators, and some combinational logic to combine the results.

The logic of FIG. 2 implements the following Boolean function, in the case of a triangle, $REJ=\text{sgn}(y2)\oplus\text{sgn}(w2)\&\ \text{sgn}(y1)\oplus\text{sgn}(w1)\&\ \text{sgn}(y0)$
   $\oplus\text{sgn}(w0)+$ $\text{sgn}\ (x2)\oplus\text{sgn}(w2)\&\ \text{sgn}(x1)\oplus\text{sgn}(w1)\&\ \text{sgn}(x0)$
   $\oplus\text{sgn}(w0)+$ $\text{sgn}\ (w2)\&\ \text{sgn}(w1)\&\ \text{sgn}(w0)+$ $\text{sgn}\ (sc\_maxy-y2)\oplus\text{sgn}(w2)\&(sc\_maxy-y1)\oplus\text{sgn}$
   $(w1)\&(sc\_maxy-y0)\oplus\text{sgn}(w0)+$ $\text{sgn}\ (sc\_maxx-x2)\oplus\text{sgn}(w2)\&(sc\_maxx-x1)\oplus\text{sgn}$
   $(w1)\&(sc\_maxx-x0)\oplus\text{sgn}(w0)$ In the first term, implemented in block 106, if all three y-coordinates have a sign different (i.e., negative) from the sign of the respective w-coordinate (which is normally positive, with a sign value of 0), then the triangle is rejected. Similarly, in the second term, implemented in block 108, if all of the x-coordinates have a sign different from the sign of the respective w-coordinate, then the triangle is rejected. In the third term, implemented in block 110, all three vertices of the triangle have a negative w-coordinate, which causes a rejection of the triangle. In the fourth term, implemented in block 102, if, for each vertex, the sign of the difference between the SC_MAXY and the y-coordinate does not match the sign of the respective w-coordinate, then the triangle is rejected. In the fifth term, implemented in block 104, if, for each vertex, the sign of the difference between the SC_MAXX and the x-coordinate does not match the sign of the respective w-coordinate, the triangle is rejected.

Figure 3:
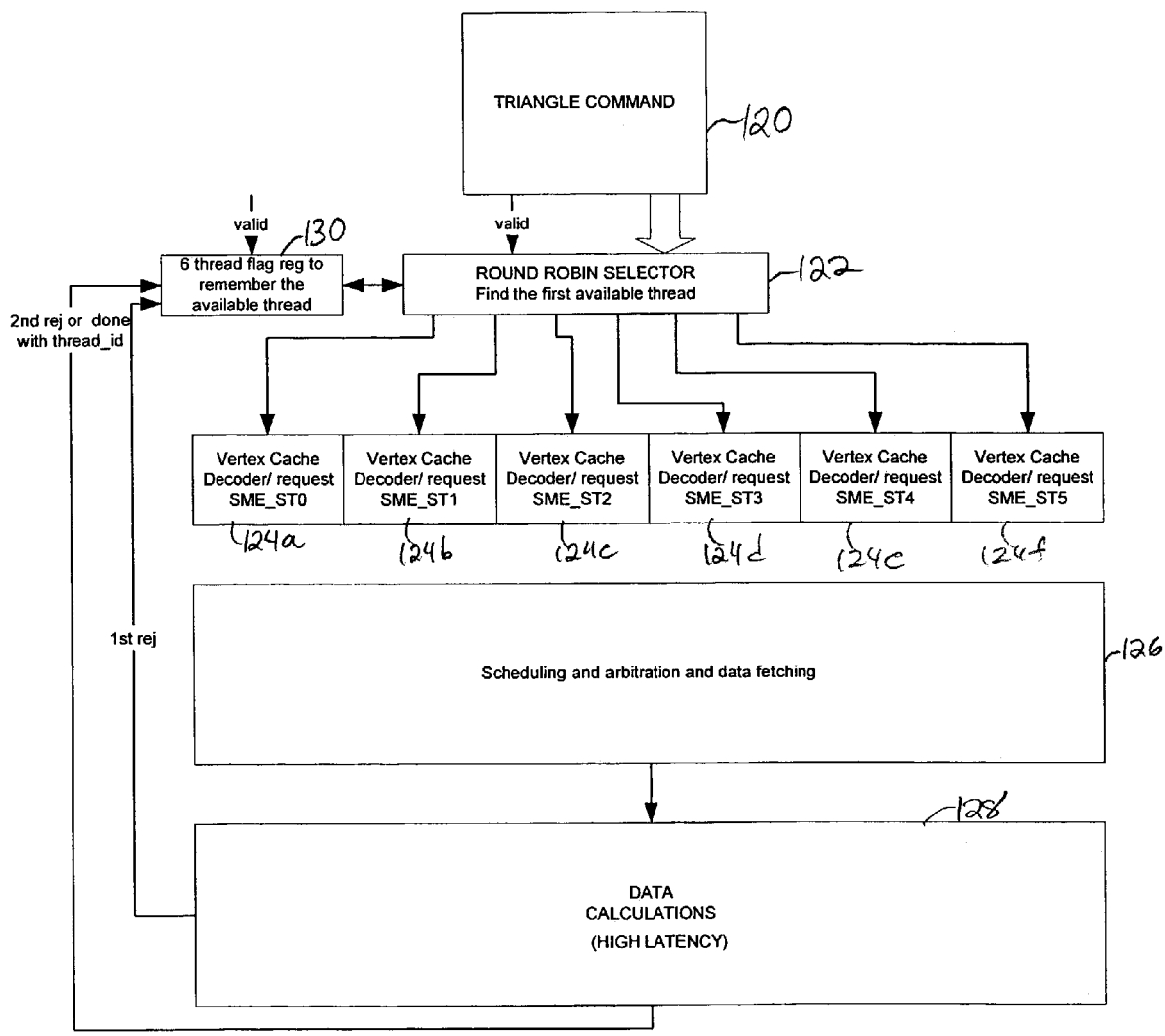
FIG. 3 shows an embodiment of a graphics engine in accordance with the present invention.

FIG. 3 shows an embodiment of a graphics engine in accordance with the present invention. The graphics engine includes a triangle command block 120, a round robin selector 122, a plurality of vertex cache decoder/request units 124a–f, a scheduling and arbitration and data fetching block 126, a data calculation block 128, and a thread flag register 130.

The triangle command block 120, receives an index for a graphics primitive, where the index is used to form a pointer to the vertices and attributes describing the primitive. The triangle command block 120 provides this index and a valid signal indicating that a valid index is present to the round robin selector 122.

The round robin selector receives the index and valid signal and based on a signal from the thread flag register, selects one of the vertex cache decoder/request units 124a–f for storage of the index.

The vertex cache decoder/request units 124a–f store an index and compute pointers to access the coordinates and data for each vertex of a primitive. These units 124a–f provide the pointers to the scheduling and arbitration and data fetching block 126, which uses the pointers to access the coordinates and attributes for each vertex of the primitive.

The data calculation block 128 is at least operative to determine from the coordinates whether or not to reject the primitive as being outside of the screen space. The data calculation block 128 implements the first and second levels of rejection described above. An indication of a first level of rejection is fed back to the thread flag register which tracks which threads (vertex cache decoder/request units) is available. An indication of the second level of rejection is fed back to the thread register as well. Because the first level of rejection can be determined in one clock cycle, performance is greatly improved if a significant number of primitives can be rejected at the first level. If 50% of all of the rejections occur at the first level and 50% occur at the second level, the performance gain is about 66% (0.5*1+0.5*5=3; 5/3= 1.666), assuming a five clock delay for computing a rejection at the second level. Furthermore, a thread can be made available for another index sooner than otherwise, so that more indexes per second can flow through the graphics engine.

Figure 4A:
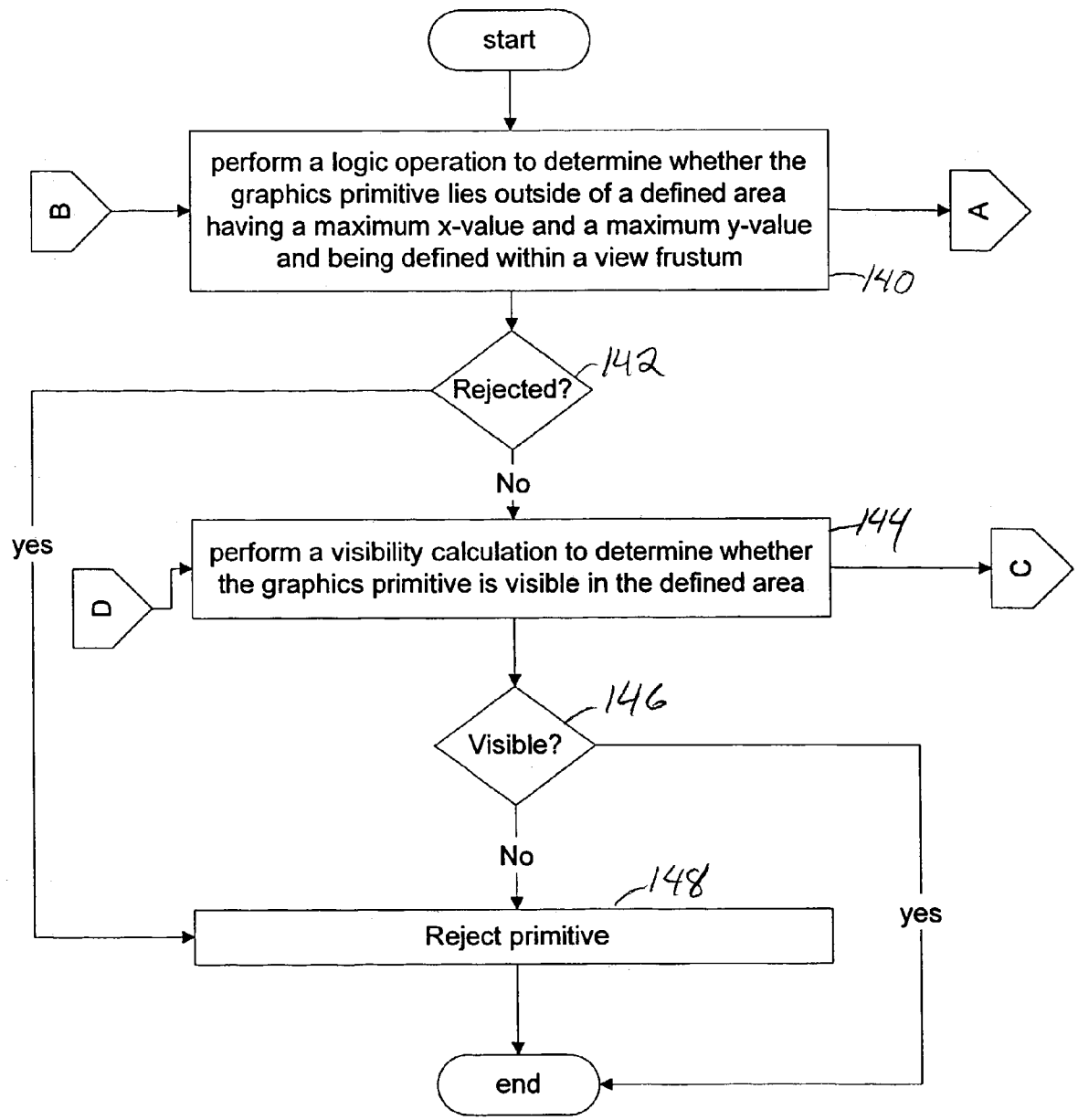
FIGS. 4A–4C show a flow chart in accordance with an embodiment of the present invention.
Figure 4B:
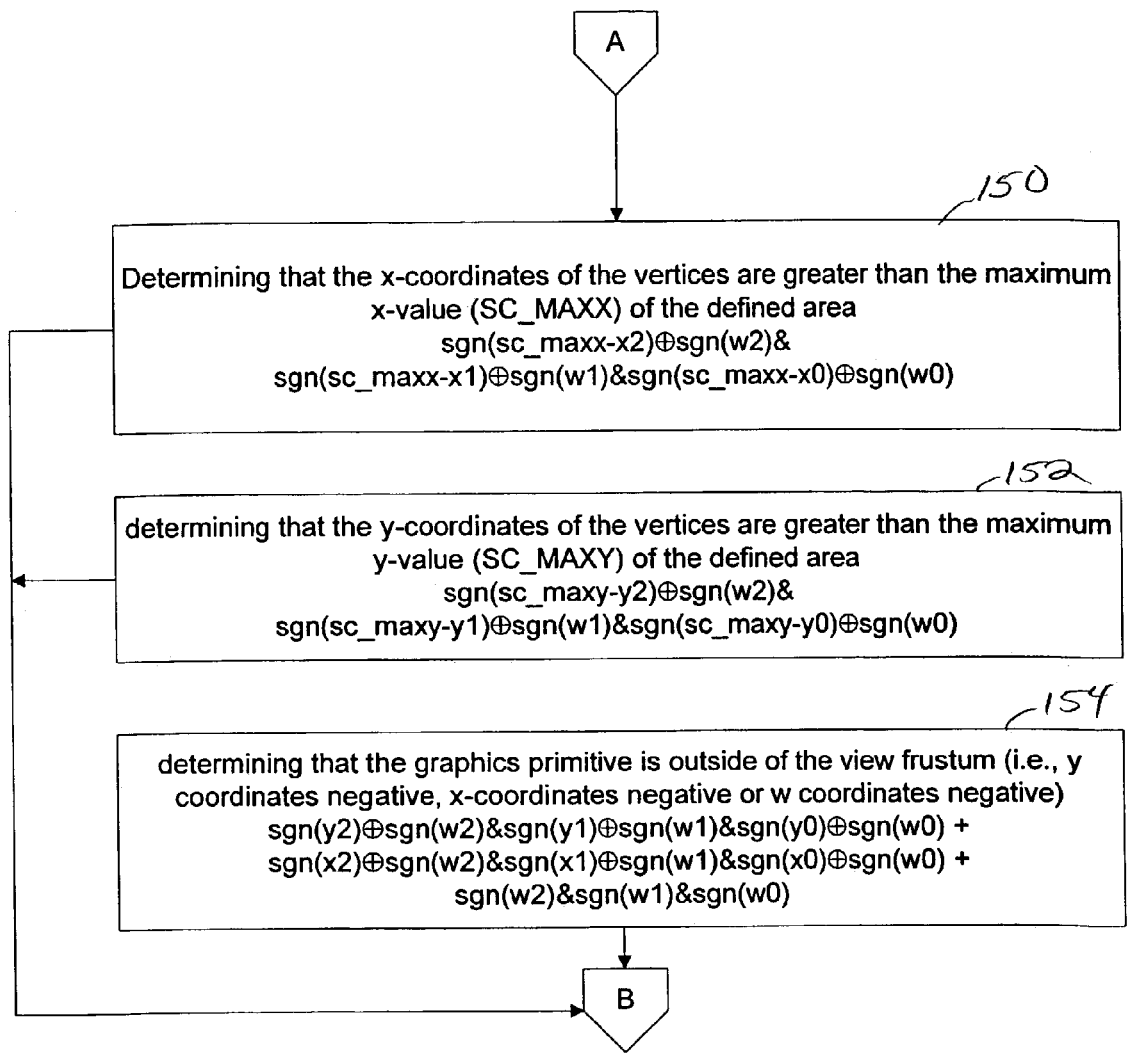
Figure 4C:
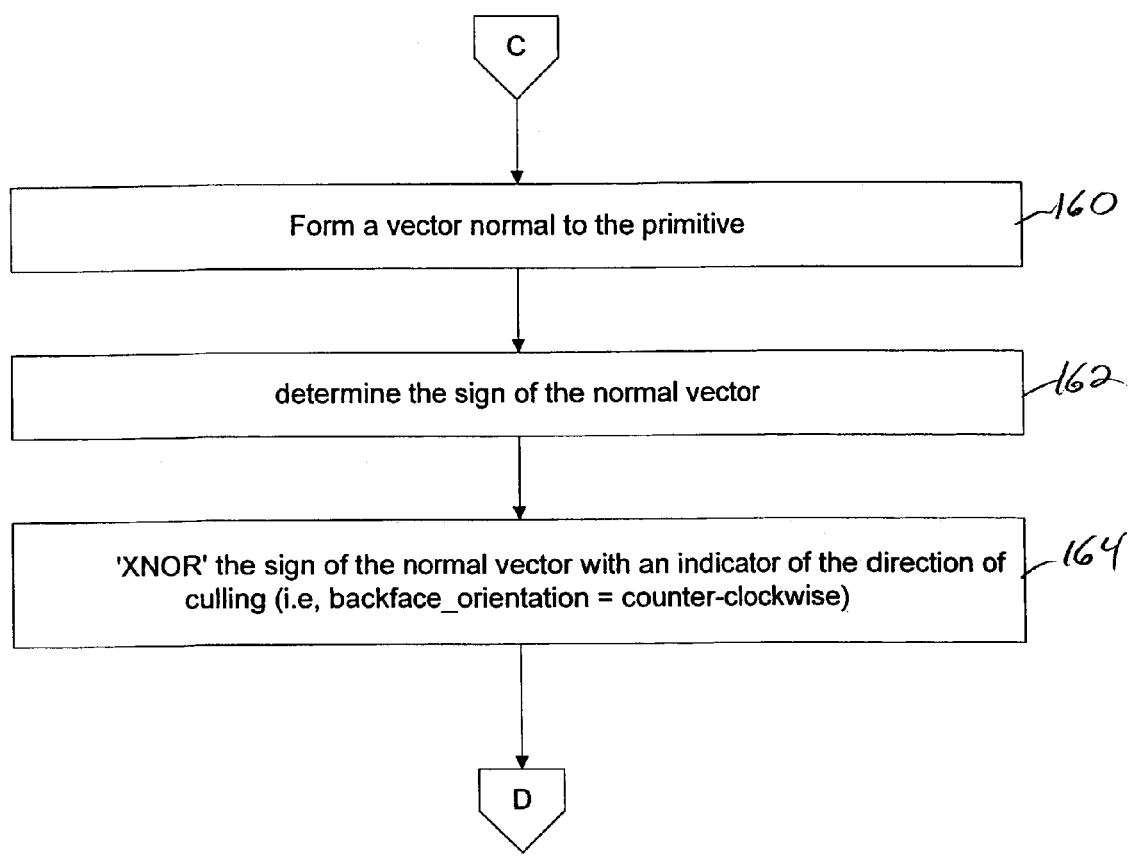

FIGS. 4A–4C show a flow chart in accordance with an embodiment of the present invention. Referring to FIG. 4A, in step 140, a logic operation is performed to determine whether the graphics primitive lies outside of a defined screen area for viewing, where the screen area is defined within a view frustum. If the primitive is not rejected, as determined in step 142, then a visibility calculation is performed, in step 144, in 3D view space. If the result of this calculation shows that the primitive is not visible, as determined in step 146, then the primitive is rejected, in step 148.

Referring to FIG. 4B, in step 150, the x-coordinates of each vertex of the graphics primitive, such as a triangle, are checked against the screen max limit (SC_MAXX), and if all of the x-coordinates exceed the screen max limit for x-coordinates, then the primitive is rejected. In step 150, the a similar check is performed for the y-coordinates of all of the vertices against the screen max limit (SC_MAXY), and if all of the y-coordinates exceed the limit, the primitive is rejected. In step 152, if all of the y-coordinates are negative, or all of the x-coordinates are negative or all of the w-coordinates are negative, the primitive is rejected.

Referring to FIG. 4C in step 160, a normal vector is formed from vectors in the plane of the primitive. In step 162, the sign of the normal vector is found, and in step 164 the sign of the normal vector is compared against the backface_orientation (which is presumed to be count-clockwise). If the directions match, then the primitive is rejected.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of rejecting a non-visible graphics primitive having a plurality of vertices, comprising:
  performing a logic operation on a first level to determine whether the graphics primitive lies outside of a defined area having a maximum x-value and a maximum y-value and being defined within a view frustum and rejecting the primitive if the primitive is outside the defined area; and
  if the graphics primitive is not rejected on the first level, performing a calculation on a second level to determine whether the graphics primitive is visible in the defined area and rejecting the primitive if it is not;
  wherein each vertex has a x, y, and w-coordinate value; and
  wherein the step of performing the logic operation on the first level includes:
    for each vertex,
      determining a sign of the x, y, z and w coordinates;
      comparing the y-coordinate to a maximum y-coordinate value and comparing the result to the sign of the w-coordinate to form a y-max result for the vertex;
      comparing the x-coordinate to a maximum x-coordinate value and comparing the result to the sign of the w-coordinate to form a x-max result for the vertex;
      comparing the sign of the x-coordinate to the sign of the w-coordinate to form a x-sign result;
      comparing the sign of the y-coordinate to the sign of the w-coordinate to form a y-sign result;
      'anding' the x-max results of the vertices;
      'anding' the y-max results of the vertices;
      'anding' the x-sign results of the vertices;
      'anding' the y-sign results of the vertices;
      'anding' the signs of the w-coordinates of the vertices; and
    determining if any of the 'anded' results is true, and if so, rejecting the primitive.

2. A system for rejecting a non-visible graphics primitive, the system comprising:
  a command block for storing an index that references a primitive, the primitive having one or more vertices;
  a round robin selector connected to the command block to receive an index;
  a plurality of vertex cache decoder/request units, each configured to store an index received from the round robin selector and to convert the index into a pointer to the coordinates of each vertex of the primitive;
  a scheduling and data fetching block connected to receive a pointer from a selected one of the decoder/request units and configured to fetch the coordinates of each vertex of the primitive using the pointer;
  a data calculation block connected to the scheduling and data fetching block and configured to determine from the fetched coordinates of each vertex whether the primitive is visible in a defined area and to provide a first level rejection signal or a second level rejection signal when the primitive is not-visible in the defined area, the first level rejection signal being provided when it can be determined that the primitive is completely outside the defined area and the view frustum, and the second level rejection signal being provided otherwise; and
  a thread flag register for storing a plurality of flags, one for each vertex cache decoder/request unit, each flag indicating whether the corresponding unit is available to receive an index, the thread flag register connected to receive a first level rejection signal and a second level rejection signal from the data calculation block and to alter the flag of the unit containing the index of the rejected primitive based on the first or second level rejection signal.

3. A system for rejecting a non-visible graphics primitive, the system comprising:
  a plurality of means for storing an index and for converting the stored index to a pointer to the vertices of a graphics primitive;
  means for storing a plurality of flags, one for each of the plurality of storing and converting means, each flag indicating whether the corresponding storing and converting means is available to store an index;
  means for selecting an index from incoming indexes and dispatching the index to one of the plurality of storing and converting means, if available according to the associated flag;
  means for selecting one of the plurality of storing and converting means having an index to obtain the pointer and for fetching the coordinates of each vertex of the primitive using the pointer;
  means for computing from the fetched coordinates whether the primitive is visible in a defined area and providing a first level rejection signal or a second level rejection signal when the primitive is not-visible in the defined area, the first level rejection signal being provided when it can be determined that the primitive is completely outside the defined area, and the second level rejection signal being provided otherwise;

means for altering a flag for the storing and converting means in response to the first and second level rejection signals.

4. A system for rejecting a non-visible graphics primitive as recited in claim 3, wherein the altering means is responsive to alter a flag to indicate that a corresponding storing and converting means is available, if the first or second rejection level signal indicates the primitive is rejected.

5. A system for rejecting a non-visible graphics primitive as recited in claim 3, wherein the providing means provides the first level rejection signal in fewer clock cycles than the second level rejection signal.

6. A system for rejecting a non-visible graphics primitive as recited in claim 3, wherein the means for providing a first level rejection signal occurs in one clock cycle.

7. A system for rejecting a non-visible graphics primitive as recited in claim 3, where the means for providing a second level rejection signal occurs in five clock cycles.

* * * * *